United States Patent [19]

Ahmed et al.

[11] Patent Number: 4,804,552
[45] Date of Patent: Feb. 14, 1989

[54] CARBONATED LIQUID DAIRY PRODUCT AND METHOD OF PRODUCTION THEREOF

[75] Inventors: Salah H. Ahmed, Elk Grove Village; John D. Kadlec, North Aurora; Anthony J. Luksas, Downers Grove, all of Ill.

[73] Assignee: Dairy Research, Inc., Rosemont, Ill.

[21] Appl. No.: 94,304

[22] Filed: Sep. 8, 1987

[51] Int. Cl.$^4$ .......................... A23C 9/14; A23C 9/156; A23G 9/12
[52] U.S. Cl. .................................... 426/580; 426/391; 426/477; 426/584
[58] Field of Search ................. 426/580, 317, 477, 397

[56] References Cited

U.S. PATENT DOCUMENTS

| | | | |
|---|---|---|---|
| 607,362 | 7/1987 | Graeff | 426/317 |
| 1,570,975 | 1/1926 | Sweeney | 426/477 |
| 2,394,303 | 2/1946 | Griesbeck | 426/393 |
| 3,851,071 | 11/1974 | Roehng et al. | 426/477 |
| 4,676,988 | 6/1987 | Efstathiou et al. | |

FOREIGN PATENT DOCUMENTS

| | | | |
|---|---|---|---|
| 89 | of 1905 | United Kingdom | 426/317 |
| 364657 | 1/1932 | United Kingdom | 426/317 |

OTHER PUBLICATIONS

Desrosier, Elements of Food Technology, 1977, Avi: Westport, Ct., pp. 417-420.
Van Slyke et al., Effect of Treating Milk With CO$_2$ Gas Under Pressure, Bulletin No. 292, Aug. 1907, N.Y. Agricultural Experiment Station: Geneva, N.Y., all pages (pp. 371-384; all pages drwg. etc.).

Primary Examiner—Donald E. Czaja
Assistant Examiner—Helen Pratt
Attorney, Agent, or Firm—Griffin, Branigan & Butler

[57] ABSTRACT

There is provided a method of carbonating a liquid dairy product to a high level of carbonization, while not destabilizing the liquid dairy product. A liquid dairy product is heated to a temperature of at least 160° F. for a time not in excess of 30 minutes, whereby the indigenous dairy protein and ash therein are at least partially denatured. The denatured liquid dairy product is then cooled to a temperature of less than about 50° F. The cooled liquid dairy product is subjected to pressurized carbon dioxide at sufficient pressures and for a sufficient time such that the taste and mouth feel of the carbonated dairy product is no longer that of the uncarbonated dairy product. The carbonation is carried out until there are at least 1.5 volumes of carbon dioxide dissolved in the dairy product. The product is then packaged in closed containers capable of substantially retaining the said degree of carbonation. The amount and extent of the heat denatured indigenous protein and ash in the dairy product is sufficient that the carbonated dairy product is buffered to a pH of at least 4.0 and the carbonated dairy product is highly carbonated but not destabilized.

20 Claims, 1 Drawing Sheet

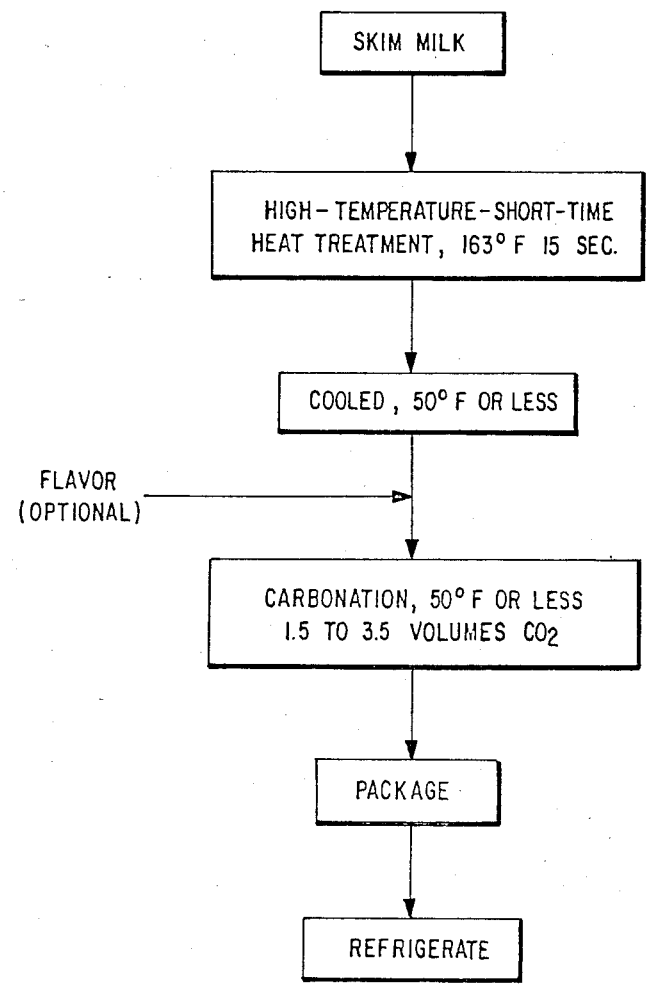

CARBONATED LIQUID DAIRY PRODUCT AND METHOD OF PRODUCTION THEREOF

The present invention relates to a carbonated liquid dairy product and the method for producing that product, and more particularly to a liquid dairy product which has been sufficiently highly carbonated that the taste and mouth feel of the carbonated product is no longer similar the taste and mouth feel of the uncarbonated liquid dairy product. Even more particularly, the invention relates to such a carbonated liquid dairy product wherein the product is stable even under the highly carbonated conditions.

BACKGROUND OF THE INVENTION

The carbonation of liquid beverages extends into antiquity. The ancient Egyptians produced a carbonated beverage similar to present day beer and the production of carbonated wines (sparkling wines) extends beyond historical records. Thus, it has been known for centuries that the carbonation of a beverage can significantly affect the taste and mouth feel of that beverage. A notable example of the significance of carbonation on taste and mouth feel has been experienced by all who have consumed a flat (decarbonated) beer or soft drinks. Consumers have for centuries made most significant distinctions between products which are uncarbonated and the same products which are carbonated. For example, the naturally occurring carbonated waters of France have long since been prized beverages, as opposed to natural uncarbonated waters, and consumers recognize that the carbonated version of the water taste considerably different from the uncarbonated version.

For over a century efforts have been made in the art to artifically carbonate beverages, as opposed to natural carbonation which occurs during beer making, wine making, and in naturally carbonated waters. Artificially carbonated beverages, such as carbonated water, have long since been a popular beverage both for consumption per se and for mixing with other beverages, such as producing an alcoholic mixed drink. In addition, a large industry exists in the World in regard to flavored carbonated water (the soft drink industry).

However, carbonated beverages have been restricted, primarily, to naturally carbonated alcoholic beverages such as beer and wine, or artifically carbonated water. This is because the carbonation generally lowers the pH of the carbonated beverage, and many beverages, aside from alcoholic beverages and water, contain systems which are unstable at the lower pHs produced during carbonation of the beverage.

In the latter regard, liquid dairy products, such as whole milk, are subject to such destabilization upon carbonation. Accordingly, a practical process for carbonating liquid dairy products, while avoiding destabilization, was never developed by the art. The destabilization of a liquid dairy product manifests itself in several manners, depending upon the degree of carbonation (and hence pH of the carbonated liquid dairy product). For example, whole milk can be lightly carbonated without any substantial destabilization. Indeed, whole milk which has not been otherwise processed contains a small amount of natural carbonation. However, that slight amount of natural carbonation is not sufficient to substantially affect the taste and mouth feel of the whole milk. There are, however, consumers who can detect a difference in taste between unprocessed whole milk and whole milk which has been processed, and hence, decarbonated.

An early attempt at carbonating whole milk is disclosed in U.S. Pat. No. 607,362. The intended purpose of that carbonation was to make the milk more durable (somewhat preserved) and more easily digestible. In addition to carbonation, formaline was added to the milk for preservation purposes. That patent points out that un-identified earlier attempts in the art at carbonating milk were totally unsuccessful in that the carbonated milk entirely lost the character of a liquid and had, in fact, more the consistency of whipped cream. This, of course, demonstrates a result of destabilization of the milk. To avoid that difficulty U.S. Pat. No. 607,362 teaches that the milk should first be de-aerated. To de-aerate, the patent teaches heating the milk to 70° to 75° C. while the milk is under a vacuum, after which the de-aerated milk is carbonated. However, while the patent does not teach specific amounts of carbonation, from the process described in that patent, it is clear that the milk was only lightly carbonated, and as the art has subsequently found such light carbonation neither substantially extends the preservation time of the milk nor substantially changes the taste and mouth feel thereof. Accordingly, that process never achieved any commercial success.

Another attempt at carbonating milk is described in U.S. Pat. No. 2,394,303. That patent recounts the knowledge in the art of carbonating milk, including pasteurized and homogenized milk, but points out that those efforts in the art encountered a substantial difficulty in that the carbonated milk so easily foamed that the carbonated milk could not be packaged in containers such that the packaged carbonated milk would substantially fill the container when the foamed carbonated milk defoamed. The foaming of the carbonated milk is another manifestation of the milk having been destabilized by the carbonation. Apparently, in the prior art recited in that process, the destabilization of the milk by the carbonation was to such an extent that it required the carbonated milk to rest for many hours in order for the foamed carbonated milk to defoam. In addition, the destabilized milk was so destabilized that when the package of the carbonated milk was opened a turbulent gushing forth and spurting out of the contents of the package took place and that, according to that patent, objects in the vicinity, as well as persons opening the flask, are frequently soiled.

That patent sought to over-come the difficulties encountered by destabilization of the milk during carbonation by pre-cooling pasteurized and homogenized milk to about 4° C. and then storing that cooled milk for a time period of about 24 hours, after which the rested milk is further cooled to about 0° C. and then carbonated. The carbonated milk is then carefully transferred to yet a second carbonator where the carbonated milk is allowed to defoam and additional carbonation then takes place.

While this is an extremely laborious, and commercially non-practical, process, the process still failed to prevent destabilization of the milk in that the patent recites that with storage of the milk, the milk becomes viscous and froths after opening the sealed container of the carbonated milk or when pouring the carbonated milk into a glass. Thus, that process and the product thereof never enjoyed commercial success and was, essentially, the last serious attempt at a commercial process for carbonating milk in a liquid form.

In this latter regard, if a liquid dairy product, such as milk, is frozen, it can be carbonated without destabilization by the carbon dioxide, but the freezing destabilizes the milk itself, and any carbonation of a frozen liquid dairy product must, for practical purposes, remain in that frozen condition and consumed in that frozen condition. An example of the foregoing is U.S. Pat. No. 3,503,757.

Thus, the art was never successful in carbonating liquid dairy products, due to the destabilization effects, when the carbonation is to an extent as to have an appreciable affect on the dairy products, either by way of a taste and mouth feel affect or a preservation affect. The art, therefor, turned to the production of a simulated carbonated milk, but this simulated carbonated milk is really a carbonated water beverage which has added thereto some milk components, e.g., dried milk solids, whey and the like, along with flavoring to provide a clouded milk-like flavored soft drink. These simulated carbonated milk products, however, have neither the nutritional value of milk nor a taste or mouth feel resembling milk, but a taste and mouth feel more resembling a carbonated water beverage.

As can be appreciated, it would be an advantage to the art to carbonate a liquid dairy product to the extent that the taste and mouth feel of that dairy product can be significantly altered. For example, for dietary reasons, some consumers are instructed by physicians or other health professionals to use skim milk in place of whole milk. However, many consumers find the taste of skim milk to be unacceptable, since skim milk has a distinctive dairy protein flavor, which is objectionable to many consumers. While whole milk, on the other hand, has a sufficient fat content that the milk protein taste of skim milk is over-ridden, many consumers find the fat taste and mouth feel of whole milk to be objectionable, in that the fat taste and mouth feel lingers in the oral cavity substantially after the milk is consumed. This lingering fat taste and mouth feel also considerably reduce the refreshing taste of whole milk, as opposed to the refreshing taste of, e.g., carbonated water.

BRIEF DESCRIPTION OF THE INVENTION

The present invention is based on several primary discoveries and several subsidiary discoveries. As a first primary discovery, it was found that when a liquid dairy product is carbonated to a sufficient degree, the taste and mouth feel of that carbonated product is no longer the same as the taste and mouth feel of the uncarbonated liquid dairy product. The taste and mouth feel changes from, e.g., the dairy protein taste and mouth feel of skim milk or the fat taste and mouth feel of whole milk, to a clear and effervescent taste and mouth feel. Thus, one aspect of this primary discovery is that it is possible to engender a taste and mouth feel to liquid dairy products which were heretofore not known by the art.

As a subsidiary discovery in this regard, it was found that the change of the taste and mouth feel does not occur until the liquid dairy product is relatively highly carbonated. While the specific degree of carbonation required for that change to occur will vary with the particular liquid dairy product, generally speaking, the carbonation must be to the extent that the liquid dairy product is provided with at least 1.5 volumes of carbon dioxide dissolved therein. Otherwise, the taste and mouth feel will be substantially the same as that of the uncarbonated liquid dairy product.

As a second primary discovery, it was found that carbonation of a liquid dairy product to the extent required, as noted above, cannot be practically achieved with natural liquid dairy products, since otherwise the destabilization noted by the prior art, and discussed above, will occur. This destablization manifests itself in the same manner described in that prior art, e.g., unwanted changes in viscosity, excessive foaming and frothing, and even precipitation of solids from the liquid dairy product. Thus, it was found that when attempting to highly carbonate natural liquid dairy products, the undesired destabilization did occur, as reported in the prior art. It was found, however, that carbonation to the extent stated above can be achieved with a liquid dairy product where the indigenous dairy protein (and to some extent the ash) of the liquid dairy product is at least partially heat denatured. With the partially heat denatured liquid dairy product, the higher carbonations required for the above noted taste change can be achieved without the destabilization of the liquid dairy product, experienced by the prior art.

As a subsidiary in the foregoing regard, it was found that the at least partially denatured liquid dairy product is capable of buffering the carbon dioxide of the carbonation such that the pH of the liquid dairy product remains above the isoelectric range of the liquid dairy product and, hence, prevents the destabilization experienced by the prior art.

As a third primary discovery, it was found that the heat denaturation of the liquid dairy product must be controlled such that the denaturation provides sufficient denatured indigenous proteins (and to some extent indigenous ash) so as to form an effective buffer, while at the same time the denaturation must not be to the extent that the partially denatured liquid dairy product significantly incurs a denatured dairy protein taste, commonly referred to in the prior art as a "cooked" taste.

As a subsidiary discovery in this regard, it was found that the amount and extent of denaturation of the liquid dairy product must be such that the carbonated liquid dairy product will be buffered by the denatured protein (and to some extent the ash) such that the pH of the liquid dairy product will be about 4.0 or above.

Thus, briefly stated, the invention provides a method of carbonating a liquid dairy product to a high level of carbonation, while not destabilizing the liquid dairy product. The process includes heating the liquid dairy product to a temperature of at least 160° F. for a time not in excess of 30 minutes, whereby by the indigenous dairy protein (and to some extent the indigenous ash) is at least partially denatured. The at least partially denatured liquid dairy product is then cooled to a temperature of less than about 50° F. Thereafter, the cooled, denatured liquid dairy product is subjected to pressurized carbon dioxide at sufficient pressures and for a sufficient time such that the taste and mouth feel of the carbonated product is no longer that of the uncarbonated dairy product, provided that at least 1.5 volumes of carbon dioxide is dissolved in the dairy product during the carbonation step. The so carbonated liquid dairy product is then packaged in a closed container capable of substantially retaining the achieved degree of carbonation. The amount and extent of the heat denatured indigenous protein and ash in the dairy product is sufficient that the carbonated dairy product is buffered to a pH of at least 4.0 and the carbonated dairy product is highly carbonated but not destablized.

The product which results from that process is a carbonated liquid dairy product comprising a liquid dairy product having at least partially heat denatured indigenous protein and ash therein and carbonated to at least 1.5 volumes of carbon dioxide, but wherein the amount and extent of the denatured protein and ash are sufficient that the carbonated product is buffered to a pH of at least 4.0 and wherein the carbonated product is stable. The amount of carbon dioxide in the carbonated liquid dairy product is also sufficient such that the taste and mouth feel of the carbonated product is no longer that of the uncarbonated liquid dairy product.

DESCRIPTION OF THE DRAWING

The FIGURE is a diagrammatic illustration of a preferred form of the process.

DETAILED DESCRIPTION OF THE INVENTION

While the present process is applicable to any liquid dairy product, including skim milk, whole milk, reduced fat content milk (e.g. 1% fat milk, 2% fat milk, etc.), cream, buttermilk, and whey, or the evaporated or condensed forms thereof, it is particularly applicable to skim milk and whole milk, for the dietary and taste reasons explained above. Thus, for sake of conciseness, the invention will be described in detail in connection with skim milk, although the process is applicable to any liquid dairy product, and the details of the process are the same for all liquid dairy products, with the exceptions noted below.

Thus, as shown in the Figure, skim milk is subjected to a heat treating step where the temperature of the skim milk is raised to at least 160° F. At this temperature, the indigenous milk protein will commence to denature. The rate and extent of the denaturation will depend upon the temperature to which the skim milk is raised and the time at which the skim milk dwells at that temperature. It is important that the denaturation be allowed to proceed to an extent sufficient that the partially denatured skim milk will product a sufficient quantity of denatured indigenous protein, and to some extent denatured indigenous ash, as explained more fully below, such that the denatured protein will form an effective buffer for the carbonated skim milk. On the other hand, the denaturation must not be allowed to proceed to the extent that a denatured protein flavor becomes significantly present in the denatured skim milk. This denatured protein flavor is commonly referred to in the art as a "cooked" taste and that taste is highly objectionable. Thus, while the extent of denaturation is critical, it can only be determined imperically.

In the latter regard, the heat treating step may be carried out at temperatures as high as about 200° F. However, at this higher temperature, the allowable dwell time without exceeding the maximum amount of denaturation which can be tolerated and yet avoid the "cooked" taste, is very short, e.g., about 5 seconds or less. Accordingly, control of denaturation at these higher temperatures is difficult, and for this reason, it is preferred that the temperature of the heating step be no higher than 195° F., since at that temperature, the time of the heating step can be up to about 15 seconds, and that amount of dwell time allows more safety in the heating step in regard to avoiding excessive denaturation and the "cooked" flavor.

Between these two times and temperatures, i.e. 160° F. for no more than 30 minutes and 200° F. for no more than 5 seconds, there are a variety of temperatures and dwell times which will provide sufficient denaturation to achieve the required buffering of the carbonated skim milk but which will not cause excessive denaturation and a resulting "cooked" taste to the skim milk. Specific dwell times at specific chosen temperatures, however, depend, to some extent, on uncontrolled factors. Among these factors are the particular apparatuses used for conducting the heat treating step, the specific source of the skim milk (particularly the breed of cow and the history of the handling of the skim milk), the age of the skim milk, and the rate of temperature increase during the heating step. Accordingly, the specific temperature above 160° F. and below 200° F. that is chosen for the heat treating step must be conducted with sufficient numbers of tests at different dwell times to ensure that the amount of denaturation does not produce a "cooked" taste in the skim milk, but on the other hand is sufficient to buffer the carbonated skim milk to a pH of at least 4.0. For example, as shown in the Figure, fresh skim milk which has been properly handled and stored can be heat treated at 163° F. for only 15 seconds and still produce sufficient denaturation of the protein to achieve the required buffering of the carbonated skim milk, when that heat treating step is carried out in a high temperature, short time pasteurization apparatus. If another apparatus, or if a different skim milk with a significantly different history is involved, the required dwell time at 163° F. may differ considerably from the 15 seconds shown in the Figure. Accordingly, an imperical determination will have to be made to determine the correct time and temperature for sufficient denaturation to achieve the required buffering, without excessive denaturation which would produce the undesired "cooked" taste.

After the skim milk is heat treated and denatured, it is cooled to a temperature of less than 50° F. and more preferably to temperatures of about 40° F. or less. At temperatures above about 50° F., it is difficult to achieve the high level of carbonation required to effect the present taste and mouth feel change, due to the solubility characteristics of carbon dioxide in skim milk (or other liquid dairy products). The cooled and partially denatured skim milk is then subjected to pressurized carbon dioxide. This step may be carried out in any of the conventional beverage carbonators, e.g., those used for conventional carbonation of conventional flavored carbonated water beverages. However, irrespective of the particular apparatus being used, the pressure of the carbon dioxide used in the carbonation of the skim milk and the time for that carbonation must be such that the resulting carbonation reaches a level where the taste and mouth feel of the carbonated skim milk is no longer the taste and mouth feel of the uncarbonated skim milk. Here again, an emperical determination must be made, but the emperical determination is quite easy to make, since when a sufficient amount of carbonation has taken place, that point can easily be detected by the taste and mouth feel change. Thus, it is only necessary to, with a series of tests, increase the degree of carbonation for any particular properly denatured liquid dairy product and taste the effect thereof. It will be quite apparent when sufficient carbonation has taken place, since at that point the taste and mouth feel will noticeably change from the taste and mouth feel of the uncarbonated skim milk.

However, it has been found that for any liquid dairy product, the level of carbonation must be at least 1.5 volumes of carbon dioxide. Otherwise, for none of the liquid dairy products will the carbonation be sufficient to achieve the change in taste and mouth feel.

As opposed to the prior art, carbonating the partially denatured skim milk does not occasion any substantial change in viscosity, or precipitation, or excessive foaming. This is an unexpected result of the present invention using the at least partially denatured skim milk. Accordingly, the problems experienced in the prior art in packaging the carbonated liquid dairy product and in dispensing the packaged carbonated liquid dairy product are not occasioned with the present invention. Under these circumstances, as opposed to the complex methods of packaging in the prior art, the present products may be packaged in a very conventional manner, e.g., packaged in the manner of a conventional carbonated water beverage, e.g., packaged in pressure proof bottles and cans with conventional closures. This is an important feature of the present invention, and, indeed, makes the invention practical from a commercial point of view, as opposed to the processes and products of the prior art.

It is, however, preferred that the packaging take place with the carbonated skim milk being in a cooled condition, e.g., less than 50° F., and more preferably less than 40° F., for two reasons. First, while the present product does not experience the foaming of the prior art, it can occasion some slight degree of foaming, depending upon the particular heat treatment step, and packaging the cooled product substantially eliminates any difficulty in this regard. Secondly, since the present product is a diary product, it must be protected from deterioration in the normal way, e.g., by refrigeration.

By this process, therefore, the amount and extent of the heat denatured indigenous protein and ash in the skim milk is sufficient that the carbonated skim milk is buffered to pH of at least 4.0. However, in order to avoid the buffered carbonated skim milk from approaching or going below the isoelectric point of the particular skim milk, bearing in mind the source and history of the skim milk, it is preferred that the pH of the buffered carbonated skim milk is at least 4.5. This will assure that for almost any skim milk the isoelectric point will not be reached either during processing, storage or consumption, and the unwanted destabilization, experienced by the prior art, will not result. Even more preferably, it is better that the buffer be to a pH of about 5.0 to about 5.7. Of course, to obtain buffering at there higher buffered pHs, it is necessary to produce more of the denatured protein and ash, but here again, this additional denatured protein and ash can be achieved in the manner described above by the imperial tests in connection with the heat treatment step.

In this latter regard, as a guide, when the temperature of the heat treatment step is at about 163° F. and the dwell time is about 1 minute or less, substantial amounts of denatured protein, and to some extent ash, will be produced, and that amount of denatured protein and ash should be sufficient to produce these higher buffered pHs. However, at that temperature and dwell time, depending upon the particular skim milk and its history, it is possible to produce excessive denatured protein and ash, and thus produce some "cooked flavor". To avoid this possibility, it is highly desirable to carry out that heat treating step, especially with the longer dwell time in a high temperature, short time pasteurizer apparatus. This minimizes the change of producing any "cooked" flavor.

Also, the chance of producing any "cooked" flavor is reduced if the skim milk is immediately cooled after the heat treating step. A high temperature, short time pasteurizer apparatus allows a very rapid cooling of the heat treated skim milk, and for this additional reason, that apparatus is greatly preferred. That cooling, as noted above, should reduce the temperature of the heat treated skim milk to at least about 50° F. or less, in preparation for carbonation. However, for higher amounts of carbonation, as described above, that temperature should be further reduced, e.g., to at least about 40° F. or less, e.g., 32° F. At these lower temperatures, and with the higher amounts of denatured protein and ash as described above, carbonation up to about 3.5 volumes of carbon dioxide can be achieved without destabilization of the skim milk. However, for most uses, it is not necessary to carbonate to that extent, and a carbonation to the extent of about 2.5 or greater volumes of carbon dioxide, e.g., about 3 volumes will be more than sufficient to achieve the change in the taste and mouth feel, as described above.

While the prior art, as noted above, ascribes some preservation effect to carbonation, and this effect has also been observed, the preservation effect is not substantial, and for practical commercial use, the carbonated skim milk should be handled in the same manner as natural skim milk. Thus, after carbonation, the carbonated skim milk should be stored, transported and handled in the same manner as any other liquid dairy product, which requires that the product always be maintained at a lower temperature. Generally, speaking, therefore, the carbonated skim milk should be stored at a temperature below about 45° F., e.g., refrigeration temperatures.

The carbonated skim milk, with the changed taste and mouth feel, is particularly amenable to flavoring. A flavoring may be added anytime prior to packaging of the carbonated skim milk, but it is preferred that any flavoring be added after the denaturing step, since the heat treatment of the denaturing step can adversely affect some flavors. The flavors can be chosen almost as desired, with the exception that the flavors should not produce substantial acidity in the flavored carbonated skim milk, since substantial acidity could over-power the buffering system and cause destabilization of the flavored carbonated skim milk. However, all of the usual flavors such as a fruit flavor, a chocolate flavor, a vanilla flavor, a soft drink flavor, or a malt flavor may be used without difficulty. The amount of the flavor used in the carbonated skim milk may be as desired, but amounts from about 0.1% to about 3%, are usual concentration ranges.

The carbonated skim milk, either in its flavored or unflavored form, should be pasteurized. The heat treating step may be sufficient to also achieve pasteurization, and hence if usual dairy equipment, which is sterile, is used in subsequent processing, then no further pasteurization of the carbonated skim milk is required. However, if desired or required, a final pasteurization step at conventional pasteurization temperatures and with conventional pasteurization equipment may be practiced just prior to packaging. However, especially at higher carbonation levels, the pasteurization step can remove some of the carbonation. Therefore, if a final pasteurization step is practiced, it is preferable to carbonate to an extent greater than that desired in the final product in order to allow for some loss of carbonation during a final pasteurization step. On the other hand, the final pasteurization step may be carried out in a pressured atmosphere, so as to minimize the loss of carbonation in the final pasteurization step, and such over carbonation, under those circumstances, will not normally be required.

The product of the invention is, therefore, a carbonated liquid dairy product with a high level of carbonization, but which is not destablized, as opposed to the carbonated liquid dairy products of the prior art. This is a result of the particular processing of the liquid dairy product, including the heat denaturation of the indigenous protein and the production of a natural buffer in the carbonated liquid dairy product. With the higher level of carbonation, i.e. above about 1.5 volumes of carbon dioxide, a significant taste and mouth feel change takes place. As noted above, this changed taste and mouth feel can be described as a clear and effervescent taste, as opposed to the dairy protein taste of skim milk and the fat taste of whole milk. Since this is a new taste and mouth feel, not heretofore disclosed in the prior art, consumers describe this new taste and mouth feel in varying descriptive terms. However, the significancy of the change in taste and mouth feel can probably best be appreciated from the consumer reactions to flavors not normally found in dairy products. For example, adding ordinary fruit flavors to a dairy product, such as skim milk, would produce a combined flavor of the skim milk and fruit flavor which would be highly objectionable to most consumers. However, since the taste and mouth feel of the present carbonated skim milk is considerably different from the taste and mouth feel of natural skim milk, the addition of a fruit flavor thereto produces a very pleasant and most refreshing beverage.

The term "denatured" in the present specification and claims refers to a partial degradation of the milk protein molecules. The mechanism of the denaturation is well known to the art, and the art has scrupulously attempted to avoid any such denaturing in the processing of liquid products.

The term "indigenous" dairy protein means the dairy proteins normally found in the particular dairy product being carbonated. While these indigenous proteins are essentially the same for all liquid dairy products, the contents thereof will differ with the particular liquid dairy product. For example, whey has a high level of the indigenous protein lactalbumin, as opposed to the proportion of lactalbumin in, e.g., skim milk.

The term "ash" is used herein the same manner as conventionally used in the dairy industry. Ash includes the non-proteinaceous components of milk, and is largely a complex arrangement of inorganic molecules. Under the heat treatment of the present process, those inorganic molecules undergo some degradation and re-arrangement. The new form thereof also contributes to the buffering ability of the heat treated liquid dairy product, although the buffering ability of the new arrangement of the ash components is not as great as the buffering ability of the denatured protein. However, the heat treated ash does contribute thereto. For purposes of the present specification and claims, the new arrangement of the ash components is also referred to as denatured ash.

The term "volume of carbon dioxide", as used herein, is the same as the standard definition as used for measuring the degree of carbonation in the soft drink and beer industries.

The invention will now be illustrated by the following Examples, but it is to be understood that the invention is not limited thereto but extends to the scope of the foregoing disclosures and following claims. In the Examples, as well as in the specification and claims, all percentages and parts are by weight, unless otherwise specified.

EXAMPLE 1

This Example, and the following Examples, illustrate various beverages which can be produced according to the present invention. In each Example a test beverage in an amount of about 4 liters was produced and each test beverage was evaluated for taste, texture, mouth feel, flavor notes, and carbonation by a Test Panel. The conclusions of the Panel are reported for each test beverage, but generally the texture and carbonate were the same for each test, e.g., a soft drink like texture and carbonation. The carbonation procedure for producing each test beverage was the same so that side-by-side direct comparisons could be made.

The procedure used in each Example was as follows. A mix to be carbonated was first prepared as described in each Example. The mix was place in a Zahm and Nagel Carbonator leaving about 20% headspace. The temperature of the mix in the carbonator was adjusted to 40° F., plus or minus 2° F. Carbon dioxide was fed to the carbonator via the dip tube (opening near the bottom of the carbonator) to a pressure of 13 psi and held at that pressure with a continuous bleed of the headspace for 15 minutes, during which time unwanted dissolved air in the mix and air in the headspace were liberated from the mix and headspace and allowed to escape via the bleed of carbon dioxide. Thereafter the bleed was discontinued and the carbon dioxide pressure was raised to about 23 psi and held at that pressure for about 20 minutes, during which the mix was agitated to ensure good carbonation, while maintaining the 40° F., plus or minus 2° F. The so carbonated beverage was then packaged in 10 ounce bottles, immediately capped and stored until testing by the Panel at refrigeration termperature (approximately 38° F).

This procedure produces a carbonation of about 3.4 volumes of carbon dioxide according to the beer/soft drink tables, but it has been found that with the present mixes these tables show a high result and that actual carbonation of the present mixes is about 88% of the value shown in the beer/soft drink tables. Hence, for present test purposes, a target value of about 3.4 volumes of carbonation according to the beer/soft drink tables produced an actual target carbonation of the mixes of about 3 volumes, which produced a stable pH of about 5.6.

Also, in each Example, the skim milk used to prepare the mix was first heated to about 163° F. for about 15 seconds in a short-time-high temperature pasteurizer apparatus to partially denature the indigenous dairy protein and ash and then quickly cooled to about 40° F.

Skim milk at about 40° F. was carbonated according to the above procedure. The Test Panel concluded that the taste was fresh, with little dairy taste or mouth feel and a flavor more similar to carbonated water than to skim milk.

EXAMPLE 2

Whole milk, 2% butterfat and 1% butterfat milk were carbonated according to the procedure of Example 1. The Test Panel concluded that as the fat content is reduced the detectable fat mouth feel is likewise reduced. However, even the whole milk test produced a product with little dairy taste or mouth feel and the 1% fat test had essentially no dairy taste or mouth feel.

EXAMPLE 3

The mix was composed of 400 g of distilled water, 300 g of Hi-Fructose 55 sweetner (American Maize Co.), 85 g of pina colada flavor (Globe No. 543950), and sufficient skim milk to produce 4 liters of mix. In this Example and in each of the following Examples, the sweetner is first diluted with the water and the flavor is then mixed into the water/sweetner solution. The colors are then mixed in and then the skim milk is mixed in with vigorous stirring. The mix was carbonated according to the procedure of Example 1. The Test Panel found the beverage to be light in mouth feel, pina colada flavored and no detectable dairy mouth feel or taste.

EXAMPLE 4

The mix was composed of 400 g distilled water, 275 g Hi-Fructose 55 sweetner (American Maize Co.), 6 g of orange flavor (Orange Cream, Harmon & Reimers), 15 drops of FDC Yellow No. 5, 3 drops of FDC Red No. 40, and sufficient skim milk to produce 4 liters of mix. The mix was carbonated according to the procedure of Example 1. The Test Panel concluded that the beverage had a bright and clear orange flavor with no detectable dairy taste or mouth feel.

EXAMPLE 5

The mix was composed of 600 g of distilled water, 500 g of Hi-Fructose sweetner (American Maize Co.), 95 g of Root Beer No. 505, 2.5 g of Natural Rum FA23, 10 g of Vanilla Cream No. 929, and 1 g of 1st Lady Cream d'Menthe, all from Virginia Dare, and sufficient skim milk to produce 4 liters of mix and sufficient caramel color to produce a brown color. The mix was carbonated according to the procedure of Example 1. The Test Panel concluded that the beverage had a taste and mouth feel very similar to a conventional root beer soft drink and had no detectable dairy mouth feel or taste.

EXAMPLE 6

The mix was composed of 600 g of distilled water, 100 g of Hi-Fructose 55 sweetner (American Maize Co.), 340 g of banana concentrate, 2.5 ml of banana essence, 10 ml of vanilla cream (Edlong No. 129), 0.75 ml of banana color (Flavorchem Banana), and sufficient skim milk to produce 4 liters of mix. The mix was carbonated according to the procedure of Example 1. The Test Panel concluded that the flavor was a clear banana flavor with no detectable dairy flavor or mouth feel.

The foregoing Examples illustrate that the present invention provides a successful method of carbonating liquid dairy products which can produce highly carbonated liquid dairy products that are either flavored or unflavored and that are essentially devoid of the usual dairy taste and mouth feel. The Examples also illustrate that any flavoring desired can be used.

What is claimed is:

1. A method of carbonating a liquid dairy product to a high level of carbonization, while not destabilizing the liquid dairy product, comprising:
   (1) heating the liquid dairy product within a temperature/time range of at least 160° F. for a time not in excess of 30 minutes to 200° F. for a time not in excess of 5 seconds, whereby the indigenous dairy product protein and ash therein are at least partially denatured to form a buffer thereof;
   (2) cooling the denatured liquid dairy product to a temperature of less than about 50° F.;
   (3) subjecting the cooled liquid dairy product to pressurized carbon dioxide at sufficient pressures and for a sufficient time such that the taste and mouth feel of the carbonated dairy product is no longer that of the uncarbonated dairy product, provided that at least 1.5 volumes of carbon dioxide are dissolved in the dairy product; and
   (4) packaging the so carbonated dairy product in closed containers capable of retaining the said degree of carbonation;
   and wherein the amount and extent of the heat denatured indigenous protein and ash in the dairy product is sufficient that the carbonated dairy product is buffered to a pH of at least 4.0 and up to 5.7 and the carbonated dairy product is highly carbonated but not destabilized.

2. The process of claim 1, wherein the heating step is conducted for no more than 1 minute.

3. The process of claim 2, wherein the heating step is carried out in a high temperature, short time pasteurizer apparatus.

4. The process of claim 1, wherein the temperature of the heating step is up to 195° F.

5. The process of claim 4, wherein the time of the heating step is no more than 1 minute.

6. The process of claim 1, wherein the denatured dairy product is cooled to about 40° F. or less.

7. The process of claim 1, wherein the carbonation step carbonates the dairy product with up to about 3.5 volumes of carbon dioxide.

8. The process of claim 7, wherein the carbonation step carbonates the dairy product with about 2.5 or greater volumes of carbon dioxide.

9. The process of claim 1, wherein the packaged carbonated dairy product is stored at temperatures below about 45° F.

10. The process of claim 1, wherein a flavoring is added in the dairy product before packaging.

11. The process of claim 10, wherein the flavoring is added after the denaturing step.

12. The process of claim 10, wherein the flavoring is a fruit flavor, chocolate flavor, vanilla flavor, soft drink flavor, or malt flavor.

13. The process of claim 1, wherein the carbonated dairy product is buffered to a pH of at least 4.5.

14. The process of claim 13, wherein the carbonated dairy product is buffered to about 5.0 to 5.7.

15. A carbonated liquid dairy product comprising a liquid dairy product having at least partially heat denatured indigenous protein and ash therein and carbonated to at least 1.5 volumes of carbon dioxide, but wherein the amount and extend of the denatured protein and ash are sufficient that the carbonated product is buffered to a pH of at least 4.0, whereby the carbonated product is stable and the amount of carbon dioxide therein is sufficient such that the taste and mouth feel of the carbonated product is no longer that of the uncarbonated liquid dairy product.

16. The product of claim 15, wherein the carbonated product contains up to 3.5 volumes of carbon dioxide.

17. The product of claim 16, wherein the carbonated product contains about 2.5 or greater volumes of carbon dioxide.

18. The product of claim 15, wherein the carbonated product contains a flavoring.

19. The product of claim 18, wherein the flavoring is a fruit flavor, chocolate flavor, vanilla flavor, soft drink flavor, or malt flavor.

20. The product of claim 15, wherein the carbonated

* * * * *

UNITED STATES PATENT AND TRADEMARK OFFICE
CERTIFICATE OF CORRECTION

PATENT NO. : 4,804,552
DATED : February 14, 1989
INVENTOR(S) : Salah H. AHMED; John D. KADLEC; and Anthony J. LUKSAS It is certified that error appears in the above—identified patent and that said Letters Patent is hereby corrected as shown below:

Column 4, line 22, after "subsidiary" insert --discovery--.

Column 5, line 41, change "product" to --produce--.

Column 7, line 48, change "there" to --these--.

Column 7, line 52, change "imperial" to --imperical--.

Column 9, line 50, after "herein" insert --in--.

Column 10, line 4, change "disclosures" to --disclosure--.

Column 12, claim 20, after the last line thereof, insert --product is pasteurized.--.

Signed and Sealed this

Twenty-ninth Day of August, 1989

Attest:

DONALD J. QUIGG

Attesting Officer

Commissioner of Patents and Trademarks